March 22, 1966  H. W. PREU ETAL  3,241,666
APPARATUS FOR SENSING SMALLER ARTICLE IN LINE
OF LARGER ARTICLES BEING CONVEYED
Filed Sept. 19, 1963  3 Sheets-Sheet 1

INVENTORS
*Helmut W. Preu*
*and*
*William G. Hohenstein*
BY *Wenderoth, Lind and Ponack*
ATTORNEYS Helmut W. Preu and
William G. Hohenstein
INVENTORS March 22, 1966   H. W. PREU ETAL   3,241,666
APPARATUS FOR SENSING SMALLER ARTICLE IN LINE
OF LARGER ARTICLES BEING CONVEYED
Filed Sept. 19, 1963   3 Sheets-Sheet 3

Helmut W. Preu and
William G. Hohenstein
INVENTORS

BY Wenderoth, Lind and Ponack
ATTORNEYS

United States Patent Office 3,241,666
Patented Mar. 22, 1966

3,241,666
APPARATUS FOR SENSING SMALLER ARTICLE IN LINE OF LARGER ARTICLES BEING CONVEYED
Helmut W. Preu and William G. Hohenstein, Albany, N.Y., assignors to The F. & M. Schaefer Brewing Co., Brooklyn, N.Y.
Filed Sept. 19, 1963, Ser. No. 310,083
11 Claims. (Cl. 209—90)

The present invention relates to an apparatus for sensing the presence of a smaller article in a line of larger articles which are being conveyed in a line by a conveyor, and for stopping the line of conveyed articles when the presence of such a smaller article is detected. More specifically, the apparatus is for sensing the presence of a smaller bottle, for instance a 12 oz. bottle, in a line of larger bottles, for instance 16 oz. bottles, which are being conveyed in a line by a conveyor to, for example a filling and labeling machine.

In the brewing and soft drink industries, where refillable bottles are returned to the filler and washed and then refilled and relabeled, the machines or workers that sort the returned empty bottles prior to their reprocessing do not always separate the different sizes of bottles completely, due to the fact that there are many different sizes of bottles in which most beverages are marketed, and often these different sizes of bottles do not vary greatly in shape or appearance from each other, particularly where the sizes are quite close to each other. For this reason, it sometimes occurs that a bottle which is smaller or larger than the bottles in a particular group being processed will get through the washing step and will be conveyed to the filling and labeling apparatus and will be refilled and labelled as a large size bottle than it actually is.

It is an object of the present invention to provide a simple yet effective apparatus for preventing a smaller article, such as a bottle, from being conveyed with a line of larger articles, such as bottles.

It is a further object of the present invention to provide an apparatus for sensing the presence of a smaller article, such as a smaller bottle, in a line of larger articles, such as bottles, which are being conveyed by means of a feeler member, which feeler member also acts to stop the line of articles being conveyed until the feeler is reset.

Other and further objects of the present invention will become apparent from the following specification and claims, taken together with the accompanying drawings, in which:

Figure 1:
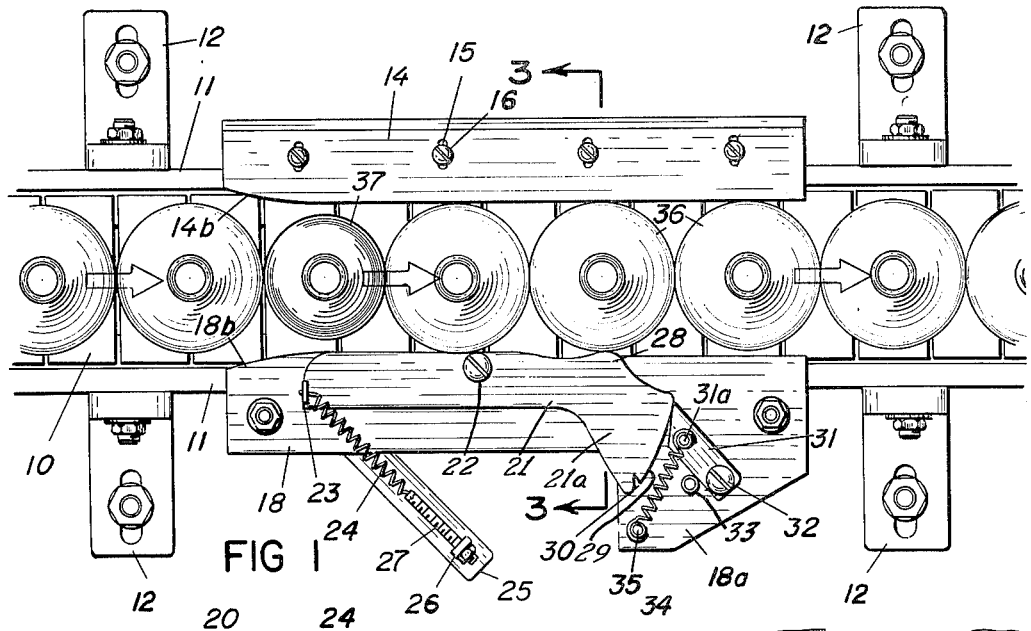
FIG. 1 is a top plan view of the apparatus according to the present invention in a position in which a larger article is passing the feeler member.
Figure 2:
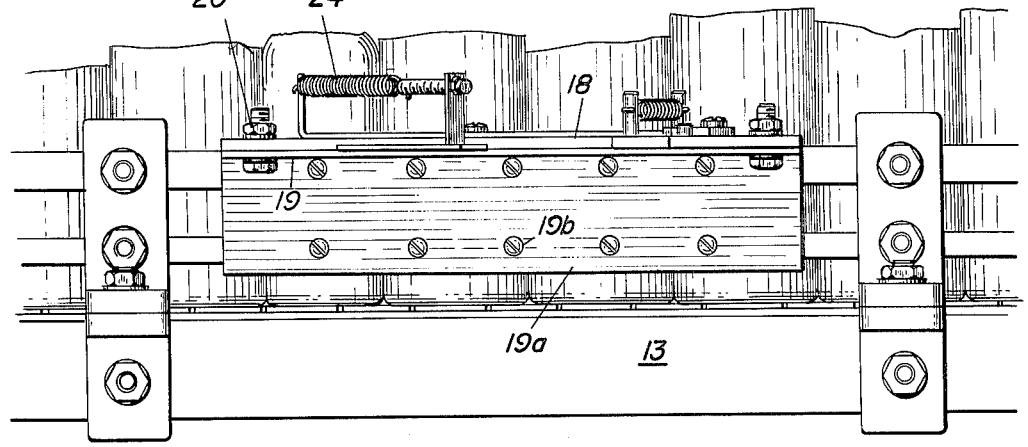
FIG. 2 is a side elevation view of the apparatus as shown in FIG. 1.
Figure 3:
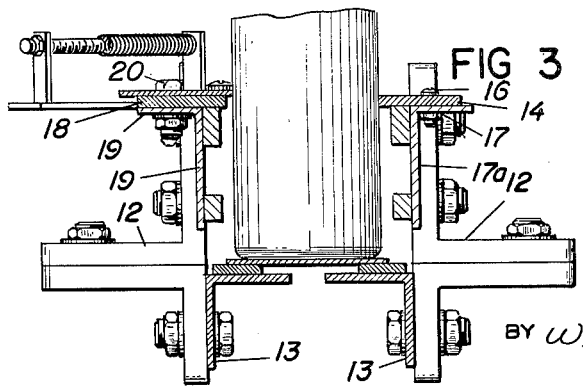
FIG. 3 is a sectional view taken on line 3—3 of FIG. 1.

Referring particularly to FIGS. 1–3, there is shown a conventional pallet type endless chain conveyor 10 for conveying a line of bottles or other articles 36 and 37, for example from a washing apparatus to a filling and labelling apparatus. The conveyor has side rails 11 which are mounted on the frame 13 of the conveyor by means of mounting brackets 12.

The apparatus according to the invention comprises an adjustable guide plate 14 positioned along one side of the conveyor 10. The adjustable guide plate 14 has elongated slots 15 therein which extend in a direction transverse to the length of the guide plate and the direction of movement of the conveyor, and extending through the elongated slots 15 are securing means 16 in the form of bolts and nuts. The securing means 16 secure the adjustable guide plate 14 to an angle bracket 17 having a downwardly depending flange 17a by which the angle bracket is secured to the side rails 11 on one side of the conveyor by means of screws or the like (not shown). It will be seen that the adjustable guide plate 14 can be adjusted transversely of the conveyor 10 by loosening the bolts 16 and sliding the guide plate 14, with the slots 15 permitting the plate to slide relative to the bolts 16.

Opposed to the adjustable guide plate 14 on the opposite side of the conveyor 10 is a fixed guide plate 18 which is secured to angle bracket 19 by securing means 20 in the form of bolts and nuts. The angle bracket 19 has a depending flange 19a by which it is secured to the side rails 11 of the conveyor by means of screws 19b or the like. The opposed end corners of the guide plates are beveled at 14b and 18b.

A feeler member 21 is a two armed lever pivoted on the fixed guide plate 18 by means of a feeler member pivot screw 22 between the two arms, in such a manner that the feeler member can pivot into and out of the path of the articles moving along the conveyor. On the free end of one arm of the feeler member 21 which is toward the direction from which the conveyor is coming, i.e. toward the upstream end of the conveyor, is an ear 23 to which one end of a biasing spring 24 is connected. The other end of the biasing spring 24 is connected to the end of a tension adjusting bolt 27 which is threadedly mounted in a spring holding ear 26 on a spring supporting arm 25. The spring supporting arm 25 is secured to the angle bracket 19 by means which are not shown. The biasing spring 24 has the tension thereof adjusted by the tension adjusting bolt 27 so as to bias the one arm of the feeler member 21 away from the path of the conveyor 10 and the other arm toward the path of the conveyor by pivoting the feeler member about the pivot screw 22.

On the side of the feeler member which moves into the conveyor path is a small projection 28 which projects laterally of the feeler member toward the adjustable guide plate 14, and on the outside edge of an enlargement 21a on the other arm of the feeler member is a cam surface 29 which has a notch 30 therein at a point along the cam surface remote from the path of the conveyor.

Pivotally mounted on a latch pivot screw 32 on an extension 18a of the fixed guide plate 15 is a latch 31, and the free end of the latch is pointed and is held against the cam surface 29 by a latch spring which is secured between a spring mounting post near the free end of the latch 31 and a spring mounting post 35 on the extension 18a. A latch stop 33 is mounted on the extension 18a between the latch pivot screw 32 and the spring mounting post 35 so that the latch spring 34 tends to pivot the latch against the stop 33 at the same time it is held against the cam surface 29.

Figure 4:
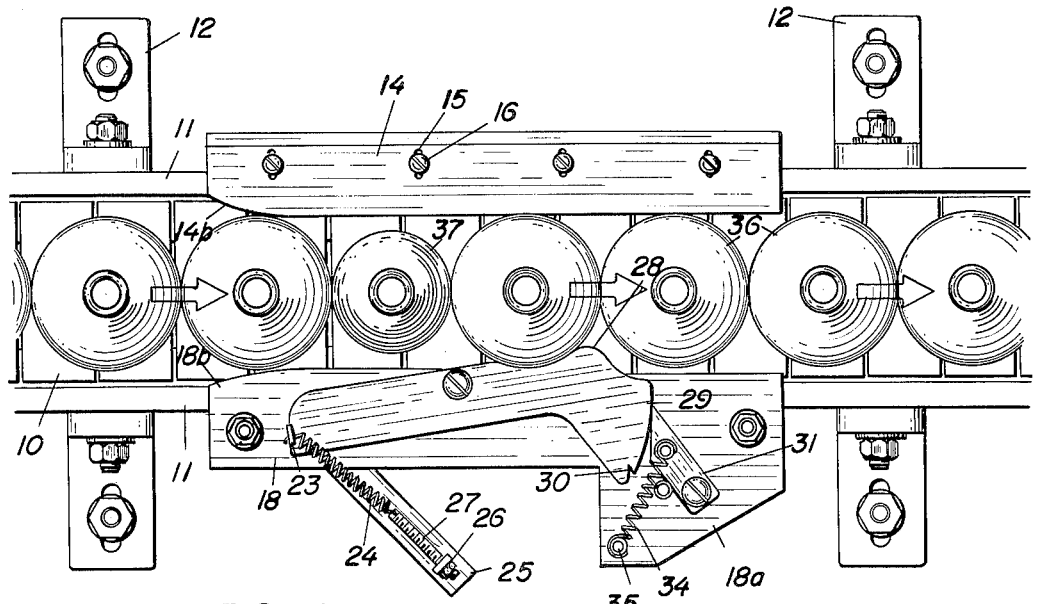
FIG. 4 is a top plan view similar to FIG. 1 showing the position of the feeler member between larger articles.
Figure 5:
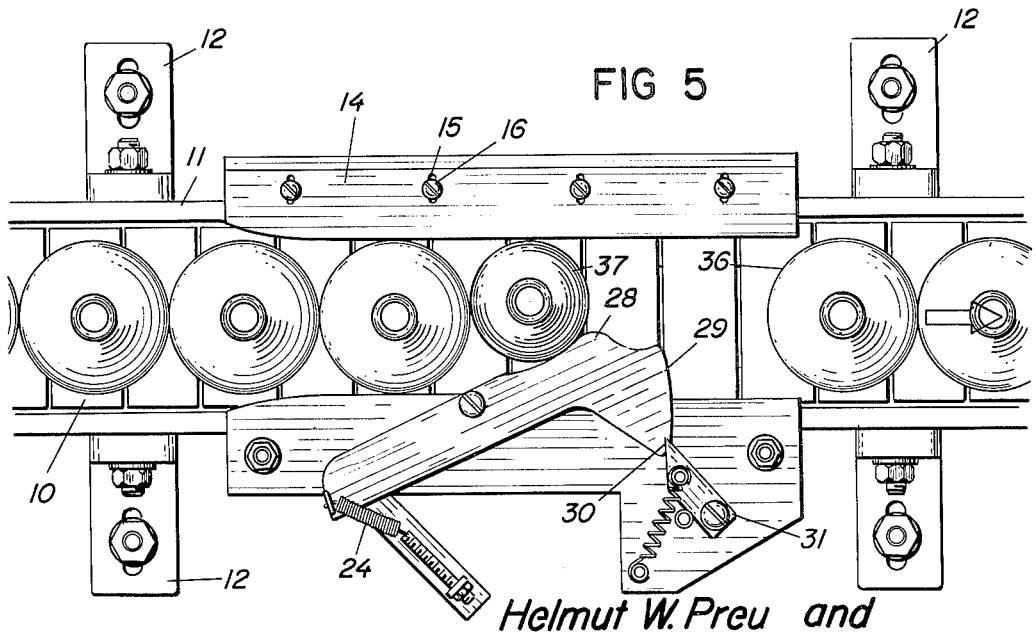
FIG. 5 is a top plan view similar to FIG. 1 showing the position of the parts of the apparatus when it senses a smaller article.

Referring to FIGS. 1, 4 and 5, the adjustable guide plate 14 is set so as to be spaced from the fixed guide plate 18 a distance only slightly larger than the diameter of larger articles 36, such as 16 oz. bottles. As the larger articles 36 are conveyed in a line by the conveyor 10, they will be guided between the guide plates 14 and 18 and past the feeler member 21. As seen in FIG. 1, as each article is directly opposite the projection 28 on the feeler member 21, the feeler member 21 will be forced out of the path of the article against the action of the biasing spring 24. As seen in FIG. 4, between the larger articles 36, the feeler member 21 will be pivoted by the biasing spring 24 about the pivot screw 22 so that the projection 28 extends between the articles, during which movement the pointed end of the latch 31 slides part way along the cam surface 29. However, the feeler member 21 does not move sufficiently far into the path of the articles so that the cam surface 29 slides along the latch sufficiently far to bring the notch 30 opposite the end of the latch 31.

However, as seen in FIG. 5, when a smaller article 37, such as a 12 oz. bottle is present in the line of articles being conveyed, the arm of the feeler arm 21 with the projection 28 thereon will be biased rather far into the path of the articles moving along the conveyor, pushing the smaller article 37 against the adjustable guide, and the movement of the cam surface 29 thereby becomes great enough so that the notch 30 moves opposite the end of the latch 31, and the latch spring 34 pulls the end of the latch 31 into the notch 30 so that when the movement of the articles along the conveyor tends to push the projection 28 out of the path of the articles, the latch 31 is forced against the stop 33, and pivoting of the feeler member 21 is prevented.

In the embodiment of the present invention which is illustrated and described in detail, the bottles 36 and 37 are not secured to the conveyor, but rather merely stand on the conveyor. Moreover, at the point at which it is preferred to install the device of the present invention, the bottles are empty. Accordingly, the conveyor 10 will move beneath the bottles, and the biasing spring 27 is made strong enough to block the movement of the bottles so that the conveyor no longer conveys them. The line of bottles will accordingly be stopped at the sensing device, and a gap will appear in the line of bottles approaching the filling and labelling machine. This gap will be noticed quite quickly by the operator of the filling and labelling machine, and it will be a simple matter for him to remove the smaller bottle 37 and swing the feeler member 21 so that the projection 28 moves toward the adjustable guide plate and the end of the latch 31 is freed from the notch 30. Thereafter, the feeler member 21 is swung back out of the path of the bottles and the latch 31 again allowed to bear on the cam surface 29. The device can then be left untended until the next time a smaller bottle is detected by the device and the line of bottles is again stopped.

It will be clear to those skilled in the art that some sort of signal device can be connected to the feeler member 21 or the latch 31 so that when a smaller article is detected, some sort of a signal will be made, either an audible or a visual signal. Similarly, the movement of the feeler member or latch could be made to operate means for stopping the conveyor if the articles being conveyed were not such that the movement of the conveyor could continue while the articles themselves were held up by the feeler member. In both cases, the provision of the latch insures that the blocked condition of the articles on the conveyor is maintained until the operator has a chance to remove the incorrectly sized article from the line of conveyed articles.

The apparatus can be modified in many ways, as is seen from the embodiments shown in FIGS. 6–9.

Figure 6:
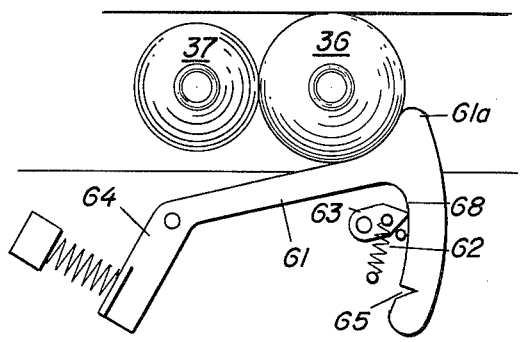
FIGS. 6–8 are schematic plan views of modified embodiments of the apparatus.

In the embodiment of FIG. 6, the upstream arm of the feeler member 61 is bent and a compression biasing spring 64 is used instead of a tension biasing spring. Further, the cam surface 68 is on the inside edge of the enlargement 61a on the other arm of the arm 61. The latch spring 62 biases the latch toward the cam surface, so that the latch 63 will engage in the notch 65 in the same manner as when the latch is on the outside of the end of the arm.

Figure 7:

In the embodiment of FIG. 7, the cam surface 79 has been placed on the arm of the feeler member 71 on the upstream end of the feeler member. When this is done, the notch 78 will be in the opposite end of the cam surface from when the cam surface is on the downstream arm of the feeler member, and the latch 77 will be accordingly positioned and biased toward the cam surface by the latch spring 76. The feeler member biasing spring 74 is a compression spring and acts on the feeler member 71 adjacent the projection thereon.

Figure 8:
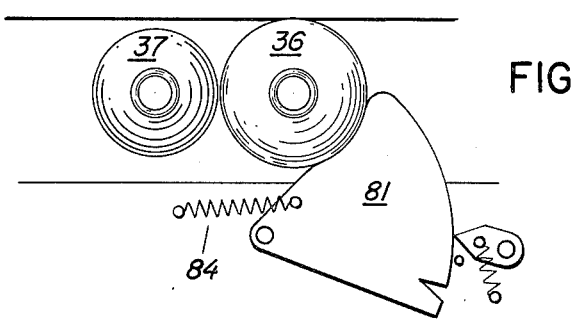

In the embodiment of FIG. 8, the feeler member 81 is a single arm lever and extends in only one direction from the pivotal mounting thereof, and the biasing spring 84 is a tension spring extending between the pivot point and the path of the articles along the conveyor. The cam surface and latch are the same as in the embodiment of FIGS. 1–5.

Figure 9:
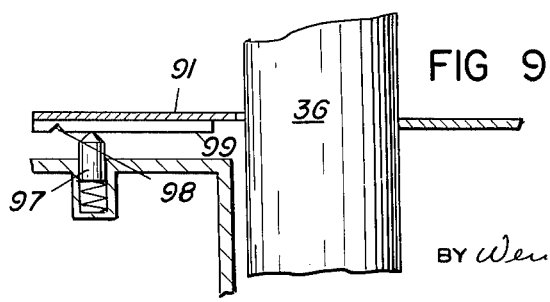
FIG. 9 is a schematic elevation view of a modified embodiment of the apparatus.

In the embodiment of FIG. 9, the cam surface, instead of being on the end edge of the feeler member, is shown at 99 on the bottom of the arm, and has a notch 98 which engages with a latch 97 which moves in a direction perpendicular to the plane of movement of the member 91. A compression latch spring 96 engages the bottom of the latch.

It will also be appreciated that a different shape could be given to the feeler arm if the shapes of the articles being conveyed so requires.

The device according to the invention is extremely simple, having only a few parts, only two of which are normally movable, and therefore requiring little attention or maintainence. The device need not be continuously monitored by an operator, and is extremely simple to reset when it is actuated upon detection of a smaller article.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. An apparatus for sensing a smaller article in a line of larger articles being conveyed along a conveyor, comprising a pair of spaced opposed guide plates adapted to be mounted on opposite sides of the path of the conveyor and spaced a distance only slightly greater than the transverse dimension of the larger articles being conveyed, a feeler member pivotally mounted on one of said guide plates and having an arm thereon adapted to move into and out of the path of the articles being conveyed along the conveyor during pivotal movement of the feeler member, biasing means connected to said feeler member for biasing said arm into the path of the articles being conveyed along the conveyor, said feeler member having a cam surface thereon movable in a direction transverse to the direction of movement of the articles along the conveyor, said cam surface having a notch therein, latch means biased against said cam surface, and a stop against which said latch means bears when the latch engages in said notch and a force is exerted on said feeler member tending to move it out of the path of articles moving along the conveyor.

2. An apparatus as claimed in claim 1 in which said feeler member is a two armed lever and is pivotally mounted between the two arms thereof, and said biasing means is connected to the free end of one arm of the lever and the other arm of the lever is the arm adapted to move into and out of the path of the articles being conveyed.

3. An apparatus as claimed in claim 2 in which said biasing means is a tension spring and adjusting means connected to said spring for adjusting the tension therein.

4. An apparatus as claimed in claim 2 in which said biasing means is a compression spring.

5. An apparatus as claimed in claim 2 in which said cam surface is on the free end of the other arm of the lever, and said notch is in the end of the cam surface remote from the path of the articles along the conveyor.

6. An apparatus as claimed in claim 5 in which the free end of the other arm of the lever has an extension thereon, and said cam surface is on an edge of said extension, and said latch has one end pivoted and the other end bearing against said cam surface.

7. An apparatus as claimed in claim 6 in which said cam surface is on the edge of said extension remote from the pivot for the feeler member.

8. An apparatus as claimed in claim 6 in which said cam surface is on the edge of said extension which is toward the pivot for the feeler member.

9. An apparatus as claimed in claim 5 in which said cam surface is on the bottom of said other lever arm of the lever, and said latch is movable in a plane perpendicular to the plane in which said feeler member moves and has one end bearing against the cam surface.

10. An apparatus as claimed in claim 1 in which said feeler member is a two armed lever and is pivotally mounted between the two arms thereof, and said biasing means is connected to the free end of one arm of lever and said one arm of the lever is the end adapted to move into and out of the path of the articles being conveyed, said cam surface being on the end of the other arm of said lever and having the notch therein at the end of the cam surface adjacent the path of the articles moving along the conveyor.

11. An apparatus as claimed in claim 1 in which said feeler member is a one armed lever having the free end thereof movable into and out of the path of the articles being conveyed, said cam surface being on the end of said one arm of the lever.

No references cited.

ROBERT B. REEVES, *Primary Examiner.*